Aug. 2, 1949.  H. W. GROTE  2,477,740
HYDROCARBON DEHYDROGENATION PROCESS USING HYDROGEN
AS A PROCESS GAS AND CARBON DIOXIDE
AS A STRIPPING MEDIUM
Filed April 29, 1947
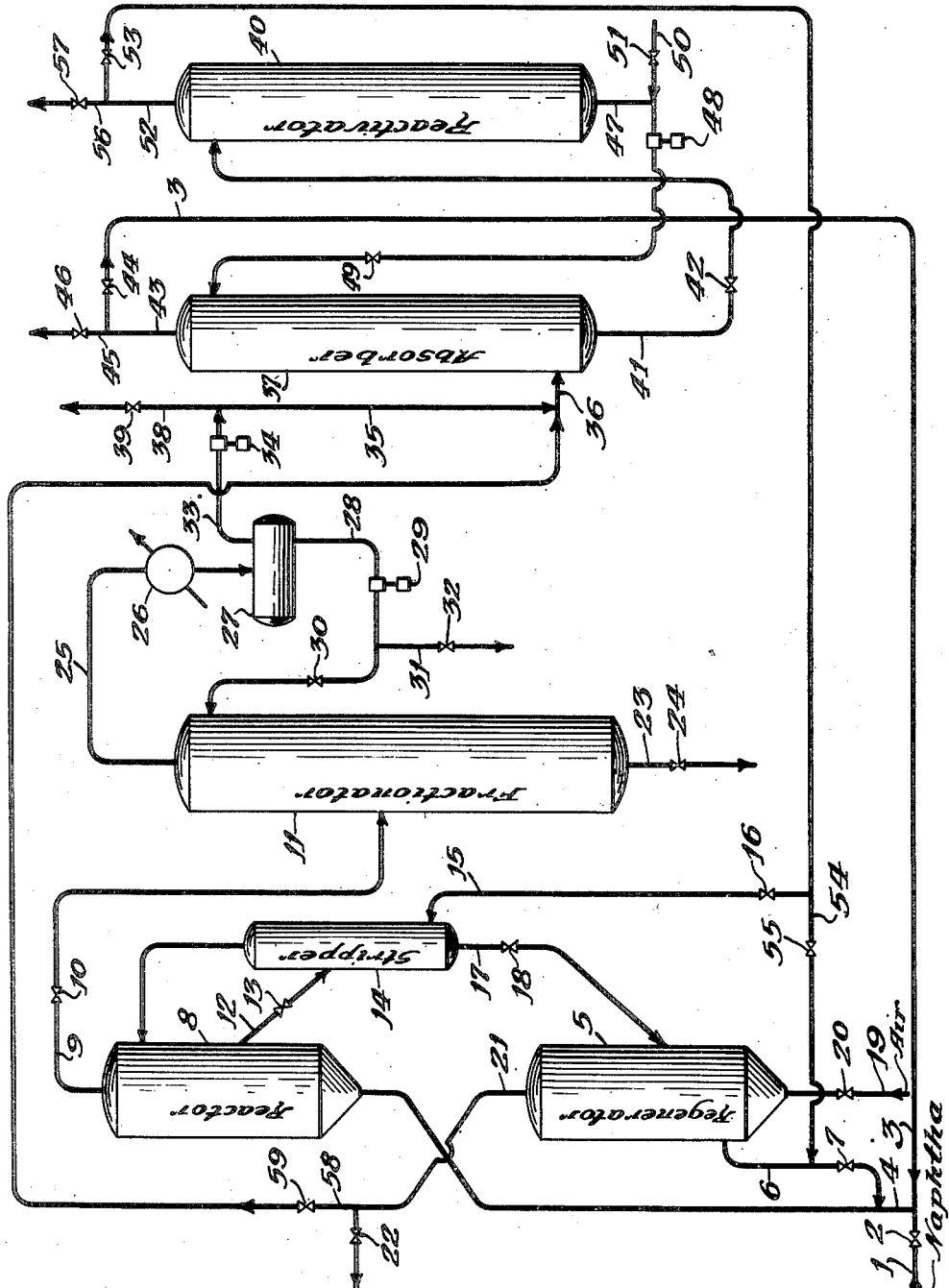
INVENTOR.
*Henry W. Grote*
BY
*Maynard P. Venema*
*Attorney.*

Patented Aug. 2, 1949

2,477,740

UNITED STATES PATENT OFFICE 2,477,740

HYDROCARBON DEHYDROGENATION PROCESS USING HYDROGEN AS A PROCESS GAS AND CARBON DIOXIDE AS A STRIPPING MEDIUM

Henry W. Grote, Downers Grove, Ill., assignor to Universal Oil Products Company, Chicago, Ill., a corporation of Delaware Application April 29, 1947, Serial No. 744,746

6 Claims. (Cl. 260—669)

This invention relates to the dehydrogenation of hydrocarbons. It is more particularly concerned with an improved method of conducting catalytic dehydrogenation processes of the fluidized or moving bed type.

In recent years the catalytic dehydrogenation of hydrocarbons has become increasingly important. Among the processes of this type that have been practiced extensively are the dehydrogenation of ethyl benzene to styrene, the dehydrogenation of butanes to butenes, the dehydrogenation of butenes to butadiene, the reforming of low octane number straight run gasolines and naphthas to higher octane number gasolines, and the like. In the newer types of dehydrogenation units, the catalyst is continuously circulated between a reactor and a regenerator either as a compact bed or in a fluidized form. In these units it is necessary to strip the catalyst passing from the reactor to the regenerator with an inert medium in order to displace some of the hydrocarbons adsorbed thereon. The stripping reduces the amount of combustibles entering the regeneration zone, thereby decreasing the loss of hydrocarbons that would otherwise be obtained and, in addition, reducing the amount of heat liberated in the regenerator thus making the temperature therein easier to control. Steam is a readily available and inexpensive stripping medium, but it has been found that its use with dehydrogenation catalysts, particularly those comprising chromia on alumina, deleteriously affects their activity and useful life. Flue gas, i. e., the combustion products of hydrocarbons and air, is undesirable as a stripping medium because the large amount of nitrogen present therein dilutes the recycle hydrogen used in most of these processes and reduces its effectiveness. More than this, nitrogen has been shown to be at least a temporary poison for chromia-alumina catalysts. I have invented a process which uses relatively pure carbon dioxide as the stripping medium, said process including a method of separating the carbon dioxide from the recycle hydrogen.

In one embodiment my invention relates to an improvement in a process wherein hydrocarbons are continuously contacted in a reactor with hydrogen and a dehydrogenation catalyst at dehydrogenation conditions, and wherein the catalyst is continuously separated from the conversion products, passed to a regeneration zone wherein the hydrocarbonaceous deposits are burned therefrom and returned to the reactor, said improvement comprising stripping the catalyst withdrawn from the reactor with carbon dioxide, commingling the mixture of carbon dioxide and the hydrocarbons desorbed from the catalyst with the conversion products, separating from said conversion products a fraction containing the bulk of the hydrogen and carbon dioxide, subjecting at least a portion of said fraction to the action of a reagent containing an organic nitrogenous base that is reactive with carbon dioxide, recycling the hydrogen recovered from said last step to the reactor, separately recovering the carbon dioxide from said reagent, and recycling the recovered carbon dioxide to the stripping step.

The catalysts employed in the process of my invention preferably comprise aluminum oxide and a dehydrogenating oxide such as the oxide of a metal of the left-hand column of group VI of the periodic table, such as chromium or molybdenum, or a metal of the left-hand column of group V of the periodic table, particularly vanadium. The preferred catalyst comprises chromium oxide supported on activated alumina, said composite usually containing from about 6 to about 15% chromia. The catalyst may be in a finely divided form such as a powder or microspheres or it may be in the form of macrospheres or beads. The first type is utilizable in fluidized catalyst operations whereas the second is utilized in moving or compact bed type processes.

The organic nitrogen-containing base that is used to separate the carbon dioxide from the hydrogen is selected primarily on the basis of its ability to react with the relatively weakly acidic carbon dioxide. I prefer to employ a solution of the base in an organic or inorganic solvent, such as an alcohol, water, or an aqueous solution of an alcohol. The concentration of organic base employed may vary from 100% to as low as 0.5%, although it is desirable to maintain at all times an amount sufficient to react completely with the carbon dioxide, and generally it is preferred to maintain an amount several times that required.

Suitable types of organic nitrogenous bases are represented by the following empirical formula:

where $R_1$, $R_2$, and $R_3$ are selected from the group consisting of hydrogen atoms and alkyl, alkenyl, cycloalkenyl, cycloalkyl, aryl, aralkyl, alkaryl, hydroxyalkyl, hydroxyalkenyl, aminoalkyl, and amino alkenyl radicals. Considering any individual member, $R_1$, $R_2$, and $R_3$ may all be alike or different, depending upon the properties of the compound established by such combinations, but at least one of the radicals must be other than hydrogen and not more than one may be aryl. Examples of such compounds are isopropyl amine, ethylene diamine, diethylene triamine, mono-, di-, and triethanolamine, and the like.

Another group of organic nitrogen-containing compounds utilizable herein are the tetra alkyl ammonium hydroxide bases represented by the empirical formula:

in which $R_1$, $R_2$, $R_3$, and $R_4$ may be alkyl or alkenyl groups and OH is a hydroxyl radical. Still another class of bases which possess excellent properties for removing carbon dioxide from admixture with hydrogen are the heterocyclic nitrogen-containing compounds such as pyridine, piperidine, pyrolle, pyrollidine, and their homologues such as alkyl and alkenyl derivatives thereof.

The advantages of my process will become apparent from the following detailed description of the attached diagrammatic drawing which illustrates one type of apparatus in which my invention may be accomplished.

Referring now to the drawing, a 200–400° F. low octane number straight run naphtha is passed through line 1 containing valve 2 and is joined by a stream of recycle hydrogen, produced as hereinafter described, flowing through line 3. The mixture of naphtha and hydrogen is directed through line 4 where it picks up hot regenerated chromia-alumina dehydrogenation catalyst, in microspherical form, that passes into line 4 from regenerator 5 through line 6 containing valve 7. The mixture of naphtha, hydrogen and catalyst is directed into the bottom of reactor 8 and is substantially uniformly distributed over the cross-sectional area of the reactor by means such as perforated plates or grids horizontally disposed therein.

A dense phase bed of catalyst particles is maintained within the reactor and is kept in a fluid-like state of relatively high density by the hydrogen and hydrocarbons passing therethrough. Above the dense phase bed, a relatively light phase region having a reduced catalyst density is maintained, wherein the catalyst is substantially separated from the process gases and vapors by means of a separator, such as a cyclone separator, not shown in the drawing. The hydrogen and hydrocarbons are discharged from the upper end of reactor 8 by means of line 9 containing valve 10 and are passed into fractionator 11.

In the reactor it is usually desirable that the temperatures be maintained within the range of from about 900° F. to about 1250° F. although in some cases it is possible to effect dehydrogenation or reforming somewhat above or below the preferred temperature range. Hydrogen is used in the reaction zone to reduce catalyst coke formation. The molal ratio of hydrogen to hydrocarbon will usually be greater than 1 but seldom greater than 8. The pressure usually is not much greater than slightly superatmospheric because high pressures tend to promote excessive carbon formation.

The catalyst in the reaction zone becomes contaminated with heavy carbonaceous material and somewhat lighter hydrocarbons, which adversely affect the activity. The hydrocarbons on the contaminated catalyst will be consumed by combustion in the regenerating zone if they are not removed from the catalyst prior to regeneration and their combustion would require the use of larger quantities of oxidizing medium. This in turn would magnify the problem of recovery of the catalyst from the flue gases. More than this, their combustion might result in increasing the temperature within the regenerator to a point such that the activity of the catalyst would be permanently impaired. To reduce the amount of carbon on the catalyst before regeneration, the contaminated catalyst from reactor 8 is passed through line 12 containing valve 13 into stripper 14. A stripping medium consisting of carbon dioxide, prepared in a manner hereinafter described, is passed through line 15 into stripper 14 near the bottom and rises therethrough countercurrently to the descending catalyst therein. The upper portion of stripper 14 provides a separating or disengaging space for vapors and catalyst particles. Suitable perforated plates or grids may be disposed within vessel 14 to provide thorough contact between the countercurrently moving streams. The hydrocarbons removed from the catalyst together with the carbon dioxide pass from vessel 14 through line 16 into the upper portion of reaction chamber 8 where they combine with the conversion products and are discharged therewith. The stripped catalyst is passed from the lower end of stripper 14 through line 17 containing valve 18 into regenerator 5.

The air employed for burning the combustibles on the contaminated catalyst is supplied through line 19 containing valve 20 to the lower end of regenerator 5 and may be distributed across the regeneration zone by means of perforated plates or grids. A dense and light phase of catalyst is maintained in regenerator 5 in a manner similar to that described in connection with reactor 8. The combustion gases leave the regenerator through line 21 containing valve 22.

The stream fractionator 11 contains reformed and unconverted naphtha, gaseous hydrocarbons, hydrogen, and carbon dioxide. The normally liquid hydrocarbons are removed from fractionator 11 as a bottoms product through line 23 containing valve 24. The remainder of the material, comprising gaseous hydrocarbons, hydrogen, and carbon dioxide, are removed overhead through line 25 and are passed through condenser 26 and into receiver 27. Some of the gaseous hydrocarbons such as the butanes and butenes are condensed in condenser 26. A portion of this material may be returned as reflux to the top of fractionator 11 via line 28, pump 29, and valve 30. A portion of this material may be withdrawn to storage through line 31 containing valve 32.

The vaporous hydrocarbons in receiver 27 are withdrawn through line 33, are compressed by compressor 34, and at least a portion thereof is passed through lines 35 and 36 into absorber 37. If desired, the excess gases may be vented or sent to storage through line 38 containing 39.

The vapors entering near the base of the absorber pass upwardly and countercurrently to the reagent containing an organic nitrogenous base which in this illustration comprises a 25% aqueous solution of diethanol amine. The carbon dioxide is absorbed by chemical reaction with the amine in the solution. This product remains in solution in the reagent and is carried with it to reactivator 40 via line 41 containing valve 42. The carbon dioxide free hydrogen passes out of the top of absorber 37 through line 43 and line 3 containing valve 44, and is returned to the reactor in admixture with naphtha in the manner hereinbefore described. Excess hydrogen may be vented from the system through line 45 containing valve 46.

In reactivator 40, the reagent is subjected to an elevated temperature which decomposes the unstable amine carbonate. A stripper drum or reboiler is generally combined with the reactivator in which the partially purified solution is heated to remove the last of the carbon dioxide. The purified amine solution is recycled from reactivator 40 to absorber 37 via line 47, pump 48, and valve 49. Make-up reagent may be added to the system through line 50 containing valve 51.

Liberated carbon dioxide is removed overhead from reactivator 40 via line 52 containing valve 53. A portion, usually the major portion, of the carbon dioxide in line 52 is directed through line 15 containing valve 16 and into stripper 14. In addition, a portion of the carbon dioxide may be used as a stripping medium for the regenerated catalyst by passing it through line 54 containing valve 55 and into line 6. Excess carbon dioxide may be removed from the system through line 56 containing valve 57.

Inasmuch as hydrogen is produced during the reaction, it ordinarily is not necessary to add make-up hydrogen to the system except for the initial operation of the unit. Carbon dioxide, however, is not produced in the dehydrogenation reaction and, since some of it usually is expelled with the vented gases, it occasionally is necessary to add make-up carbon dioxide to the process. This may be accomplished simply and inexpensively by diverting a portion of the regenerator effluent gases, which contain an appreciable amount of carbon dioxide, from line 21 into line 58 containing valve 59 and thence through line 36 into absorber 37. The carbon dioxide will be absorbed by the amine solution and the remaining inert gases may be vented from the system via line 45.

I claim as my invention:

1. In a process wherein hydrocarbons are continuously contacted in a reactor with hydrogen and a dehydrogenation catalyst at dehydrogenation conditions, and wherein the catalyst is continuously separated from the conversion products, passed to a regeneration zone wherein the hydrocarbonaceous deposits are burned therefrom and returned to the reactor, the improvement which comprises stripping the catalyst withdrawn from the reactor with carbon dioxide, commingling the mixture of carbon dioxide and the hydrocarbons desorbed from the catalyst with the conversion products, separating from said conversion products a fraction containing the bulk of the hydrogen and carbon dioxide, subjecting at least a portion of said fraction to the action of a reagent containing an organic nitrogenous base that is reactive with carbon dioxide, recycling the hydrogen recovered from said last step to the reactor, separately recovering the carbon dioxide from said reagent, and recycling the recovered carbon dioxide to the stripping step.

2. The process of claim 1 further characterized in that the reagent containing an organic nitrogenous base is an aqueous solution of an organic nitrogenous base.

3. The process of claim 2 further characterized in that the aqueous solution of an organic nitrogenous base is an aqueous solution of an ethanol amine.

4. A process wherein hydrocarbons are continuously contacted in a reactor with hydrogen and a dehydrogenation catalyst at dehydrogenation conditions, and wherein the catalyst is continuously separated from the conversion products, passed to a regeneration zone wherein the hydrocarbonaceous deposits are burned therefrom and returned to the reactor, the improvement which comprises stripping the catalyst withdrawn from the reactor with carbon dioxide, commingling the mixture of carbon dioxide and the hydrocarbons desorbed from the catalyst with the conversion products, separating from said conversion products a fraction containing the bulk of the hydrogen and carbon dioxide, subjecting at least a portion of said fraction together with at least a portion of the regenerator effluent gases to the action of a reagent containing an organic nitrogenous base that is reactive with carbon dioxide, recycling the hydrogen recovered from said last step to the reactor, separately recovering the carbon dioxide from said reagent, and recycling the recovered carbon dioxide to the stripping step.

5. The process of claim 4 further characterized in that the reagent containing an organic nitrogenous base is an aqueous solution of an organic nitrogenous base.

6. The process of claim 5 further characterized in that the aqueous solution of an organic nitrogenous base is an aqueous solution of an ethanol amine.

HENRY W. GROTE.

REFERENCES CITED

The following references are of record in the file of this patent:

UNITED STATES PATENTS

| Number | Name | Date |
| --- | --- | --- |
| 2,360,463 | Arveson | Oct. 17, 1944 |
| 2,419,323 | Meinert et al. | Apr. 22, 1947 |
| 2,421,677 | Belchetz | June 3, 1947 |
| 2,422,262 | Russell, 3rd | June 17, 1947 |